(12) United States Patent
Fujioka

(10) Patent No.: US 9,936,180 B2
(45) Date of Patent: Apr. 3, 2018

(54) PROJECTOR AND METHOD FOR CONTROLLING THE SAME

(71) Applicant: CANON KABUSHIKI KAISHA, Tokyo (JP)

(72) Inventor: Masaki Fujioka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/471,328

(22) Filed: Mar. 28, 2017

(65) Prior Publication Data

US 2017/0289508 A1 Oct. 5, 2017

(30) Foreign Application Priority Data

Mar. 29, 2016 (JP) ................. 2016-066314

(51) Int. Cl.
*H04N 9/78* (2006.01)
*H04N 9/31* (2006.01)

(52) U.S. Cl.
CPC ......... *H04N 9/3182* (2013.01); *H04N 9/3105* (2013.01); *H04N 9/78* (2013.01)

(58) Field of Classification Search
CPC .......... H04N 9/31; H04N 9/78; H04N 9/3182; H04N 9/3105
USPC ..................... 348/751, 744, 229.1
See application file for complete search history.

(56) References Cited

U.S. PATENT DOCUMENTS

| | | | | |
|---|---|---|---|---|
| 8,144,214 B2* | 3/2012 | Yamashita | ........... | H04N 5/2351 348/229.1 |
| 8,351,695 B2* | 1/2013 | Tsuruoka | ................. | H04N 9/77 382/167 |
| 8,665,289 B2* | 3/2014 | Holub | ....................... | G06F 3/14 345/589 |
| 8,988,552 B2* | 3/2015 | Atkins | ................... | H04N 5/235 348/229.1 |
| 9,621,767 B1* | 4/2017 | El Mezeni | ........... | H04N 19/186 |
| 2014/0210847 A1* | 7/2014 | Knibbeler | ............. | G09G 5/006 345/589 |

FOREIGN PATENT DOCUMENTS

JP  2015-159543 A  9/2015

* cited by examiner

*Primary Examiner* — Trang U Tran
(74) *Attorney, Agent, or Firm* — Carter, DeLuca, Farrell & Schmidt, LLP

(57) ABSTRACT

A projector calculates an input-output characteristic for converting a tone value of an input image so as to perform display in a given projectable luminance range in a display absolute luminance range of an input signal, in accordance with the brightness of the projection surface. An output signal is generated from the input signal and projected, based on the calculated input-output characteristic. With the disclosed projector, image data having an input luminance range that is different from the output luminance range can be appropriately displayed.

12 Claims, 12 Drawing Sheets

PROJECTOR AND METHOD FOR CONTROLLING THE SAME

BACKGROUND OF THE INVENTION

Field of the Invention

The present invention relates to projectors and methods for controlling the same.

Description of the Related Art

Conventionally, image data is compressed into a narrow dynamic range that is defined in standards (e.g. BT.709 (Rec.709)) based on the assumption that the image data is to be displayed on a CRT (Cathode Ray Tube) display. However, display devices having a wider dynamic range than that of CRT displays, such as liquid-crystal display devices, are commonly used at present, and there are situations where, on the contrary, the capability of display devices cannot be fully utilized with image data that conforms to conventional standards.

For this reason, standards that define image data having a wider dynamic range than in conventional standards (hereinafter referred to as "HDR (High Dynamic Range) image data") have been proposed. Examples of the HDR image data standards include ST.2084, which is proposed by SMPTE (Society of Motion Picture and Television Engineers). Signal characteristics in the ST.2084 standard are defined by an EOTF (Electro-Optical Transfer Function). The EOTF in ST.2084 is expressed by the following equation, and a scene luminance value (video signal level) is assigned within an absolute display luminance range with a maximum value of 10000 nit (or $cd/m^2$) (Japanese Patent Laid-Open No. 2015-159543).

$$E' = \left( \frac{C_1 + C_2 L^{m_1}}{1 + C_3 L^{m_1}} \right)^{m_2}$$

Here, L denotes a display luminance ($0 \le L \le 1$, $L=1$ corresponds to 10000 nit), and E' denotes a video signal level (digital value). $m_1$, $m_2$, and $c_1$ to $c_3$ are constants, and specific values are defined for those constants in ST.2084. The EOTF in ST.2084 has a non-linear quantization step that corresponds to human visual characteristics, and is therefore also called a PQ (Perceptual Quantization) curve.

For example, in the case of displaying such HDR image data on a common device having a dynamic range that is larger than that in BT.709 but small than in ST.2084, the display luminance range (input luminance range) of the image data may be larger than the display luminance range (output luminance range) of the device. In this case, if the input luminance range is compressed in accordance with the output luminance range to display the image data, the displayed image data appears dark overall. If a decrease in luminance due to compression of the dynamic range is corrected, the tone continuity may decrease or the original tone is impaired due to the influence of the tone that was lost as a result of compression. When the input luminance range is smaller than the output luminance range, a problem arises in that, even if display is performed while expanding the input luminance range in accordance with the output luminance range, naturally the image data is not displayed with the correct tone either.

In particular, regarding devices in which the output luminance range (projection surface luminance range) varies depending on settings or the environment as in the case of projectors, a configuration for appropriately displaying image data having an input range that is different from the output luminance range has been hitherto unknown.

SUMMARY OF THE INVENTION

The present invention provides a projector capable of appropriately displaying image data having an input luminance range that is different from an output luminance range, and a method for controlling this projector.

According to an aspect of the present invention, there is provided a projector comprising: a first obtaining unit configured to obtain information that defines a relationship between a tone value and an absolute luminance value of image data to be projected; a second obtaining unit configured to obtain a maximum luminance on a projection surface that is achieved by the projector; a generation unit configured to generate a tone-conversion characteristic based on the information and the maximum luminance; and an application unit configured to apply the tone-conversion characteristic to the image data and supply the image data to projection unit, wherein the generation unit generates the tone-conversion characteristic such that a relationship between the tone value of the image data after the tone-conversion characteristic has been applied thereto and a luminance on the projection surface satisfies the relationship between the tone value and the absolute luminance value obtained by the first obtaining unit in at least part of a tone value range.

According to another aspect of the present invention, there is provided a method for controlling a projector, the method comprising: obtaining information that defines a relationship between a tone value and an absolute luminance value of image data to be projected; obtaining a maximum luminance on a projection surface that is achieved by the projector; generating a tone-conversion characteristic based on the information and the maximum luminance; and applying the tone-conversion characteristic to the image data and supplying the image data to projection unit, wherein, during the generating, the tone-conversion characteristic is generated such that a relationship between the tone value of the image data after the tone-conversion characteristic has been applied thereto and a luminance on the projection surface satisfies the relationship between the tone value and the absolute luminance value obtained during the obtaining in at least part of a tone value range.

According to a further aspect of the present invention, there is provided a non-transitory computer-readable medium that stores a program for causing a computer provided in a projector to function as: a first obtaining unit configured to obtain information that defines a relationship between a tone value and an absolute luminance value of image data to be projected; a second obtaining unit configured to obtain a maximum luminance on a projection surface that is achieved by the projector; a generation unit configured to generate a tone-conversion characteristic based on the information and the maximum luminance; and a application unit configured to apply the tone-conversion characteristic to the image data and supply the image data to a projection unit, wherein the generation unit generates the tone-conversion characteristic such that a relationship between the tone value of the image data after the tone-conversion characteristic has been applied thereto and a luminance on the projection surface satisfies the relationship between the tone value and the absolute luminance value obtained by the first obtaining unit in at least part of a tone value range.

Further features of the present invention will become apparent from the following description of exemplary embodiments with reference to the attached drawings.

DESCRIPTION OF THE EMBODIMENTS

Figure 1:
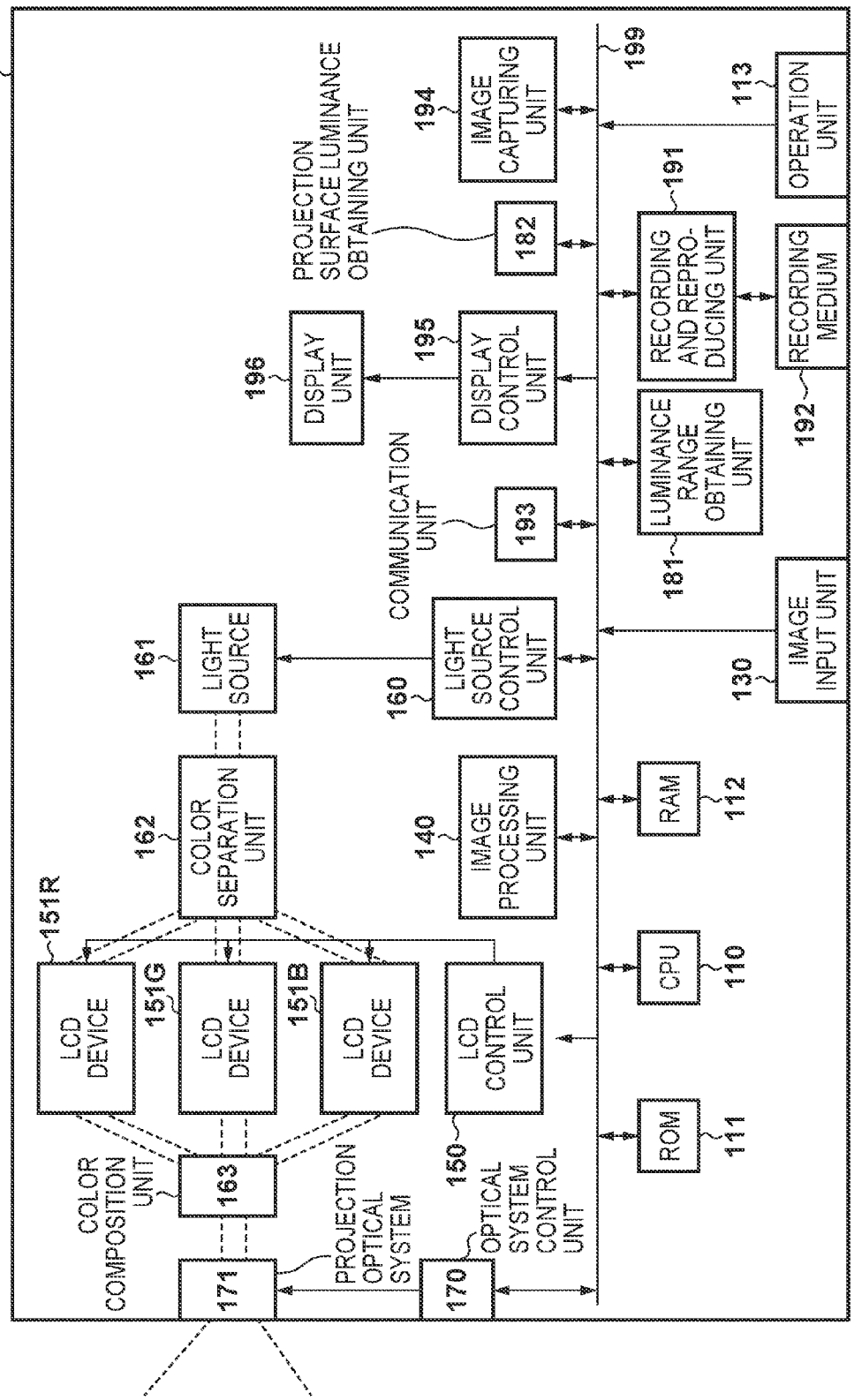
FIG. 1 is a block diagram showing an exemplary functional configuration of an LCD projector according to embodiments.

Exemplary embodiments of the present invention will now be described in detail in accordance with the accompanying drawings. FIG. 1 is a block diagram showing an exemplary functional configuration of a projector using LCD devices (LCD projector), which serves as an example of a projector according to the embodiments of the present invention.

First Embodiment

Overall Configuration

An LCD projector 100 has a CPU 110, a ROM 111, a RAM 112, an operation unit 113, an image input unit 130, and an image processing unit 140. The LCD projector 100 also has a LCD control unit 150, LCD devices 151R, 151G, and 151B, a light source control unit 160, a light source 161, a color separation unit 162, a color composition unit 163, an optical system control unit 170, and a projection optical system 171. The LCD projector 100 may also have a recording and reproducing unit 191, a recording medium 192, a communication unit 193, an image capturing unit 194, a display control unit 195, and a display unit 196.

The CPU 110 controls each functional block and realizes the functions of the LCD projector 100 by loading a program in, for example, the RAM 112, the program being stored in a nonvolatile memory (e.g. the ROM 111), and executing the loaded program. Programs to be executed by the CPU 110, various set values, GUI data, product information, and the like are stored in the ROM 111, which may be at least partially rewritable. The RAM 112 serves as a work memory for the CPU 110, and programs and data are temporarily stored in the RAM 112.

Still image data and moving image data that are reproduced from the recording medium 192 by the recording and reproducing unit 191 can be temporarily stored in the CPU 110, and the CPU 110 can also reproduce images and videos from the stored data using a program stored in the ROM 111. Still image data and moving image data that are received from the communication unit 193 can be temporarily stored in the CPU 110, and the CPU 110 can also reproduce images and videos from the stored data using a program stored in the ROM 111. Images and videos obtained by the image capturing unit 194 can be temporarily stored in the RAM 112, and converted into still image data and moving image data and recorded in the recording medium 192 by using a program stored in the ROM 111.

The operation unit 113 is constituted by, for example, a switch, a dial, a touch panel provided on the display unit 196, or the like, and accepts instructions from the user. The operation unit 113 may have a signal reception unit for receiving signals from an external device that functions as a remote controller, for example. The CPU 110 executes operations corresponding to an operation made to the operation unit 113 and the input from the communication unit 193. Here, the external device may be any electronic device capable of transmitting a signal that can be received by the signal reception unit and recognized by the CPU 110. Examples of such an electronic device include a personal computer, a camera, a mobile phone, a smartphone, a hard disk recorder, a game console, and the like, but are not limited thereto.

The image processing unit 140 is constituted by, for example, a microprocessor for image processing, performs processing to change the number of frames, the number of pixels, the image shape, or the like on video signals received from the image input unit 130, and transmits the processed video signals to the LCD control unit 150. The image processing unit 140 does not need to be a dedicated microprocessor, and for example, the CPU 110 may realize at least some of the functions of the image processing unit 140 by executing a program stored in the ROM 111. The image processing unit 140 can execute frame-thinning processing, frame interpolation processing, resolution conversion (scaling) processing, distortion correction processing (keystone correction processing), or the like on video signals input in the form of moving images, for example. The image processing unit 140 can also perform the aforementioned processing to change images and videos that are reproduced by the CPU 110.

The LCD control unit 150 controls the voltage to be applied to the liquid crystal of pixels of the liquid-crystal elements 151R, 151G, and 151B, based on the video signals that have been processed by the image processing unit 140, and adjusts the transmission factors of the LCD devices 151R, 151G, and 151B. Note that the LCD devices 151R, 151G, and 151B will be referred to collectively as a LCD device 151.

The LCD device 151R is a LCD device that corresponds to red, and is used to adjust the transmission factor of red light in light that is output from the light source 161 and separated into red (R), green (G), and blue (B) by the color separation unit 162. Similarly, the LCD device 151G and the LCD device 151B are used to adjust the transmission factors of green light and blue light, respectively.

The light source control unit 160 is constituted by a control microprocessor, and controls the light amount and the switching on and off of the light source 161. Note that the light source control unit 160 does not need to be a dedicated microprocessor, and for example, the CPU 110 may realize at least some of the functions of the light source control unit 160 by executing a program stored in the ROM 111.

The light source 161 may be a halogen lamp, a xenon lamp, a high-pressure mercury lamp, or the like, for example, and outputs light for projecting an image. The color separation unit 162 is constituted by a dichroic mirror, a prism, or the like, for example, and separates the light that is output from the light source 161 into red (R), green (G), and blue (B) light. Note that if the light source 161 can output red (R), green (G), and blue (B) light, the color separation unit 162 is not required.

The color composition unit 163 is constituted by a dichroic mirror, a prism, or the like, for example, and composites the red (R), green (G), and blue (B) light that has passed through the LCD devices 151R, 151G, and 151B. The light composited by the color composition unit 163 enters the projection optical system 171. The transmission factors of the LCD devices 151R, 151G, and 151B are controlled by the LCD control unit 150 so as to be values that correspond to an image that is input from the image processing unit 140. Accordingly, upon the light composited by the color composition unit 163 being projected by the projection optical system 171, the same image as the image input by the image processing unit 140 is displayed on a projection surface.

The optical system control unit 170 is constituted by a control microprocessor, and controls the projection optical system 171. Note that the optical system control unit 170 does not need to be a dedicated microprocessor, and for example, the CPU 110 may realize at least some of the functions of the optical system control unit 170 by executing a program stored in the ROM 111.

The projection optical system 171 is constituted by a plurality of lenses and an actuator for driving the lenses, and projects the composited light that has entered from the color composition unit 163. The projected image can be subjected to zooming in and out, as well as focus adjustment or the like by using the actuator to drive the lenses in the projection optical system 171, and the lenses are thus driven by the optical system control unit 170.

A luminance range obtaining unit 181 (first obtaining unit) obtains information, such as an absolute luminance range, that defines a relationship between a tone value of an input image and an absolute luminance value, from meta data (e.g. EXIF data) or header information that accompanies input image data. The absolute luminance range may be values that are manually input by the user using the operation unit 113, instead of values obtained from the input image data. When the absolute luminance range is expressed using values, either luminance values (nit or $cd/m^2$) or reflectance (%) may be used. In this embodiment, luminance values (nit) are used. The absolute luminance range obtained by the luminance range obtaining unit 181 indicates a lower limit value and an upper limit value, such as "0 to 2000 [nit]" or "0 to 10000 [nit]". However, if the lower limit value is a fixed value such as 0 [nit] or 0.005 [nit], it is sufficient that at least the upper limit value (maximum luminance) is obtainable.

A projection surface luminance obtaining unit 182 (second obtaining unit) obtains the projection surface luminance range. A method for obtaining the projection surface luminance range will be described later.

The recording and reproducing unit 191 reads out still image data and moving image data from the recording medium 192 to reproduce the read image data, and receives, from the CPU 110, still image data and moving image data obtained by the image capturing unit 194 and records the received image data in the recording medium 192. The recording and reproducing unit 191 can also record, in the recording medium 192, still image data and moving image data received via the communication unit 193. The recording and reproducing unit 191 has an interface for accessing the recording medium 192 and a microprocessor for communicating with the recording medium 192, for example. If the recording medium 192 is a removable medium, the recording and reproducing unit 191 also has a mechanism such as a slot for removably holding the recording medium 192. Note that the recording and reproducing unit 191 does not need to have a dedicated microprocessor, and for example, the CPU 110 may realize at least some of the functions of the recording and reproducing unit 191 by executing a program stored in the ROM 111. Data other than still image data and moving image data, such as control data for the LCD projector 100 according to this embodiment, can also be recorded in the recording medium 192. The recording medium 192 may be a recording medium in any format, such as a magnetic disc, an optical disk, or a semiconductor memory, and may be either removable or fixed with respect to the LCD projector 100.

The communication unit 193 communicates control signals, still image data, moving image data, or the like with an external device in accordance with the control performed by the CPU 110. There is no limitation on communication methods or standards, and for example, communication conforming to one or more of wireless LAN, wired LAN, USB, Bluetooth (registered trademark), and the like can be performed. Note that if the image input unit 130 conforms to HDMI (registered trademark), the communication unit 193 may perform CEC communication with an external device that is connected to the image input unit 130. If, for example, a terminal of the image input unit 130 is an HDMI (registered trademark) terminal, CEC (Consumer Electronic Control) communication may be performed via that terminal. Here, the external device may be any electronic device capable of communicating with the LCD projector 100, and may be a personal computer, a camera, a mobile phone, a smartphone, a hard disk recorder, a game console, a remote controller, or the like, for example.

The image input unit 130 includes an interface for mainly receiving image signals from the external device. Accordingly, the image input unit 130 may have one or more of known video input interfaces such as D-Sub, DVI-D, DVI-I, HDMI, DisplayPort, USB, Composite, S-Video, Component, and D1 to D5.

The image capturing unit 194 is configured and arranged so as to be able to capture the projection surface of the LCD projector 100, and transmits the captured image to the CPU 110. The CPU 110 temporarily stores, in the RAM 112, the image obtained by the image capturing unit 194, and converts the stored image into still image data or moving image data based on a program stored in the ROM 111. The image capturing unit 194 has imaging lenses for forming an optical image of an object, an actuator for driving a focusing lens and a zoom lens included in the imaging lenses, a microprocessor for controlling the actuator, and an image sensor for converting the optical image formed by the imaging lenses into an image signal. The image capturing unit 194 may also have an AD conversion unit for converting an analog image signal output by the image sensor into a digital image signal. Note that the image capturing unit 194 is not limited to one for capturing the projection surface, and may also be one for capturing the side opposite to the side on which the projection surface is, for example.

The display control unit 195 has a microprocessor, for example, and causes the display unit 196 to display an operation screen for operating the LCD projector 100 and GUI images such as a switch icon. Note that the display control unit 195 does not need to have a dedicated microprocessor, and for example, the CPU 110 may realize at least some of the functions of the display control unit 195 by executing a program stored in the ROM 111.

The display unit 196 may be a display device in any form, such as an LCD, a CRT display, an organic EL display, or an LED display. The display unit 196 is not limited to a matrix display, and may include, for example, light-emitting elements incorporated in a button, a switch, or the like.

Note that the image processing unit 140, the LCD control unit 150, the light source control unit 160, the optical system control unit 170, the recording and reproducing unit 191, and the display control unit 195 according to this embodiment may be a single or multiple microprocessors capable of performing the same processing as the processing of those blocks. Alternatively, for example, the CPU 110 may realize at least some of the functions of one or more functional blocks that do not have a processor by executing a program stored in the ROM 111.

Basic Operation

A basic operation of the LCD projector 100 according to this embodiment will be described using a flowchart shown in FIG. 2. Essentially, the operation in each step in the flowchart in FIG. 2 is realized as a result of the CPU 110 executing a program stored in the ROM 111 and controlling the functional blocks shown in FIG. 1.

Figure 2:
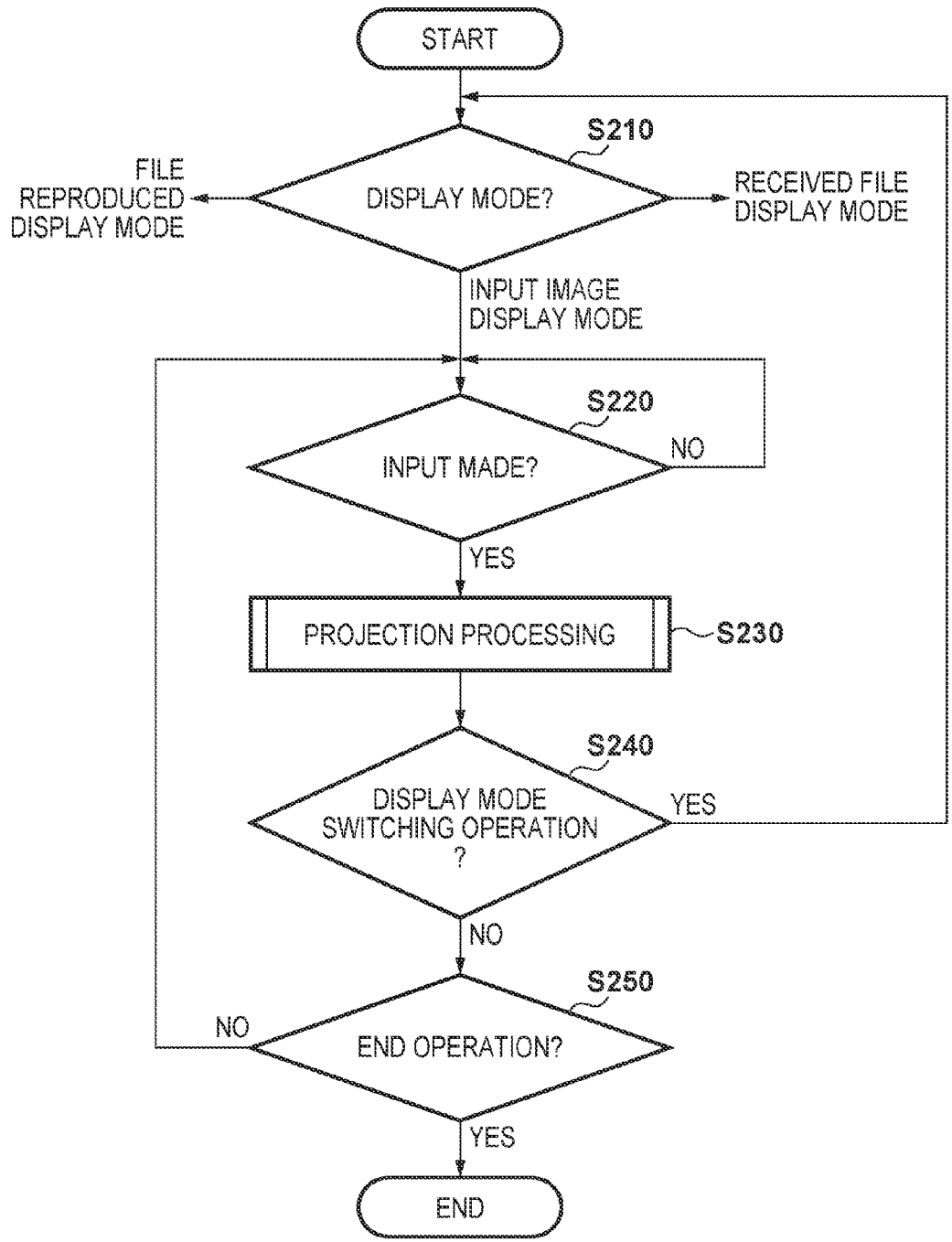
FIG. 2 is a flowchart related to a basic operation of the LCD projector according to the embodiments.

FIG. 2 shows processing that is started when an instruction to turn on the power of the LCD projector 100 is input through the operation unit 113 or an external device.

Upon the instruction to turn on power being input, the CPU 110 causes a power supply unit (not shown) to supply power to each unit of the LCD projector 100.

Next, the CPU 110 determines the display mode of the LCD projector 100 (S210). The display mode is designated via the operation unit 113 or an external device, for example, and the display mode of the LCD projector 100 according to this embodiment is one of an "input image display mode", a "reproduced file display mode", and a "received file display mode", but is not limited thereto. In the "input image display mode", the LCD projector 100 displays an image that is based on a video signal that is input from the image input unit 130. In the "reproduced file display mode", the LCD projector 100 displays an image that is based on data that is read out from the recording medium 192 by the recording and reproducing unit 191. In the "received file display mode", the LCD projector 100 displays an image that is based on data received from the communication unit 193. Note that the display mode when the power is turned on may be the display mode that was last used when the projector was turned off, or a predetermined display mode. In this case, the display mode does not necessarily need to be designated by the user.

A description will be given here of the case where the display mode is the "input image display mode" according to the determination result in step S210.

In the case of the "input image display mode", the CPU 110 determines whether a video signal has been input from the image input unit 130 (S220), and waits if it is not determined that a video signal has been input, or advances the processing to step S230 if it is determined that a video signal has been input.

In step S230, the CPU 110 executes projection processing. The CPU 110 transmits the video signal that has been input from the image input unit 130 to the image processing unit 140, and causes the image processing unit 140 to generate an image for one screen. The image processing unit 140 applies the necessary transformation processing (e.g. regarding the number of pixels, the frame rate, and the shape) to the video signal, generates an image for one screen, and transmits the generated image to the LCD control unit 150. The LCD control unit 150 controls the transmission factors of respective pixels of the LCD devices 151R, 151G, and 151B so as to obtain the transmission factors corresponding to the tone levels of the respective red (R), green (G), and blue (B) color components of the pixels of the received image for one screen.

The light source control unit 160 controls the output of light from the light source 161 based on the peripheral brightness that is based on the image obtained by the image capturing unit 194, for example. The light output from the light source 161 is separated into red (R), green (G), and blue (B) light by the color separation unit 162, and is supplied as a light source for the LCD devices 151R, 151G, and 151B. The light of the respective colors for which the transmission factors have been controlled for the respective pixels of the LCD devices 151R, 151G, and 151B is composited by the color composition unit 163, and is projected via the projection optical system 171.

The CPU 110 controls a series of operations in those units during the projection processing. The projection processing is sequentially executed until video signal input is no longer detected or an instruction to end display is given.

Note that if an instruction to change the angle of view (magnification ratio) or the focus of the projection optical system 171 is input from the operation unit 113 during the processing in steps S220 to S250, the CPU 110 drives the actuator provided in the projection optical system 171 in accordance with the instruction.

In step S240, the CPU 110 determines whether an instruction to switch the display mode has been input from the operation unit 113, and returns the processing to step S210 if it is determined that an instruction has been input, or advances the processing to step S250 if it is not determined that an instruction has been input. Note that, in the case of returning the processing to step S210, the CPU 110 transmits a menu screen for display mode selection as an OSD image to the image processing unit 140, and controls the image processing unit 140 to display the menu screen so as to superimpose the menu screen on a currently-projected image. The user can operate the menu screen displayed in a superimposed manner using the operation unit 113, and select a desired display mode.

On the other hand, in step S250, the CPU 110 determines whether an instruction to end the projection has been input from the operation unit 113, and returns the processing to step S220 if it is not determined that an instruction has been input, or stops power supply from the power supply unit to each block and ends the processing if it is determined that an instruction has been input. With the above operation, the LCD projector 100 in the input image display mode projects an image based on the video signal input from the image input unit 130.

Note that if it is determined in step S210 that the display mode is the "reproduced file display mode", the CPU 110 causes the recording and reproducing unit 191 to read out a file list or thumbnail data of each file in the recording medium 192, and temporarily stores the read file list or thumbnail data in the RAM 112. The CPU 110 then generates file selection screen data based on a text character image that is based on the file list that is temporarily stored in the RAM 112 or the thumbnail data of each file, and transmits the generated file selection screen data to the image processing unit 140. The file selection screen is projected through the same processing as the projection processing (S230).

If an instruction to select a specific image file is input from the file selection screen via the operation unit 113 or an external device, the CPU 110 controls the recording and reproducing unit 191 to reproduce the selected image file.

The image data reproduced from the image file is transmitted from the recording and reproducing unit 191 to the image processing unit 140, and is projected through the same projection processing as that in step S230 by the image processing unit 140, the LCD control unit 150, and the light source control unit 160. If a moving image is to be reproduced, reproduction and projection processing are sequentially executed for each frame. The CPU 110 executes the operation performed in the case where an operation related to the projection optical system 171 has been made and the operations indicated in steps S240 and S250 in the same manner as in the input image display mode.

If it is determined in step S210 that the display mode is the "received file display mode", the CPU 110 projects still image data or moving image data received from the communication unit 193 in the same manner as the image data reproduced by the recording and reproducing unit 191 in the reproduced file display mode. The CPU 110 executes the operation in the case where an operation related to the projection optical system 171 has been made and the operations indicated in steps S240 and S250 in the same manner as in the input image display mode.

Figure 3:
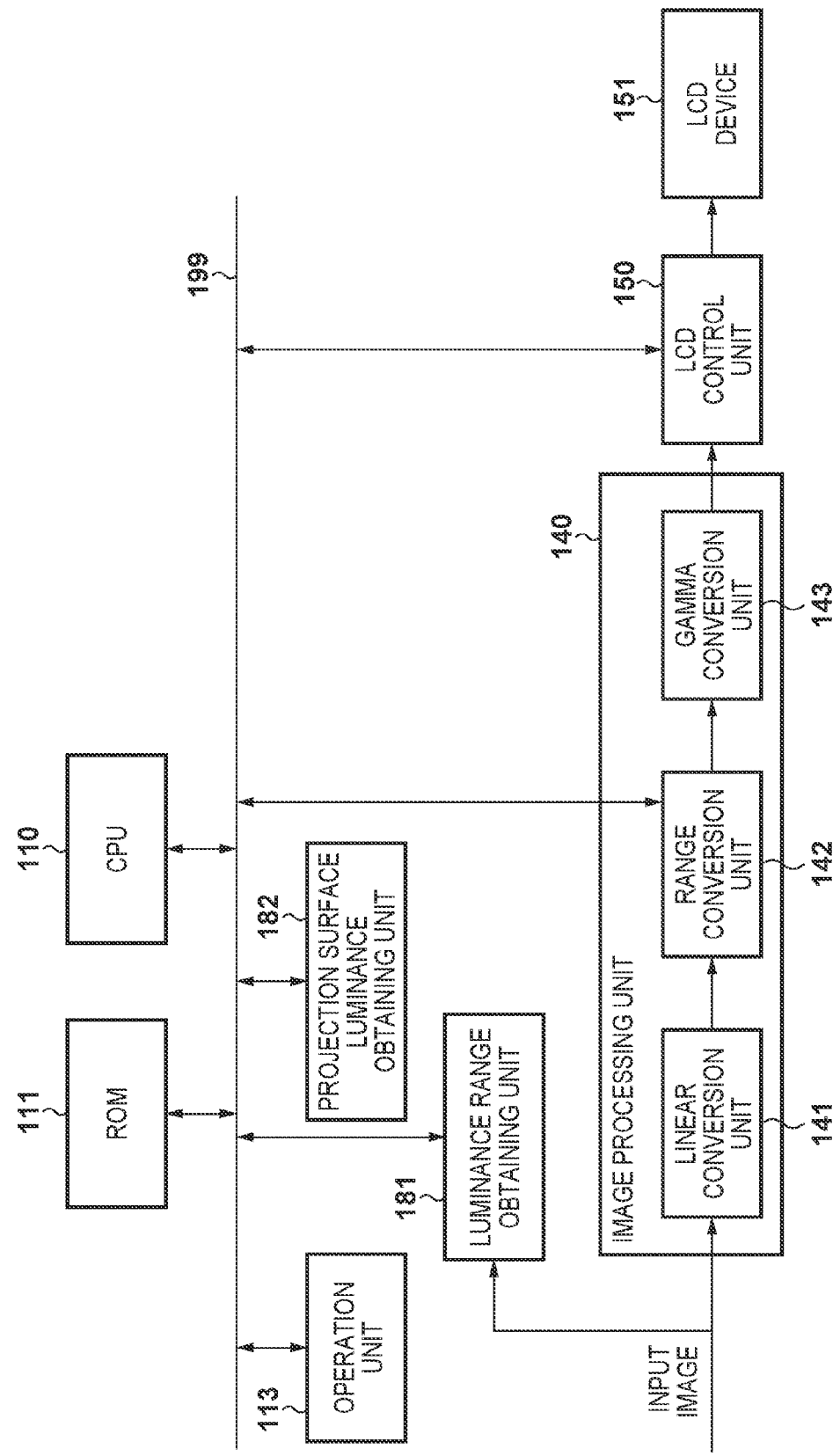
FIG. 3 is a block diagram showing a configuration for a projecting operation according to the embodiments.
Figure 4:
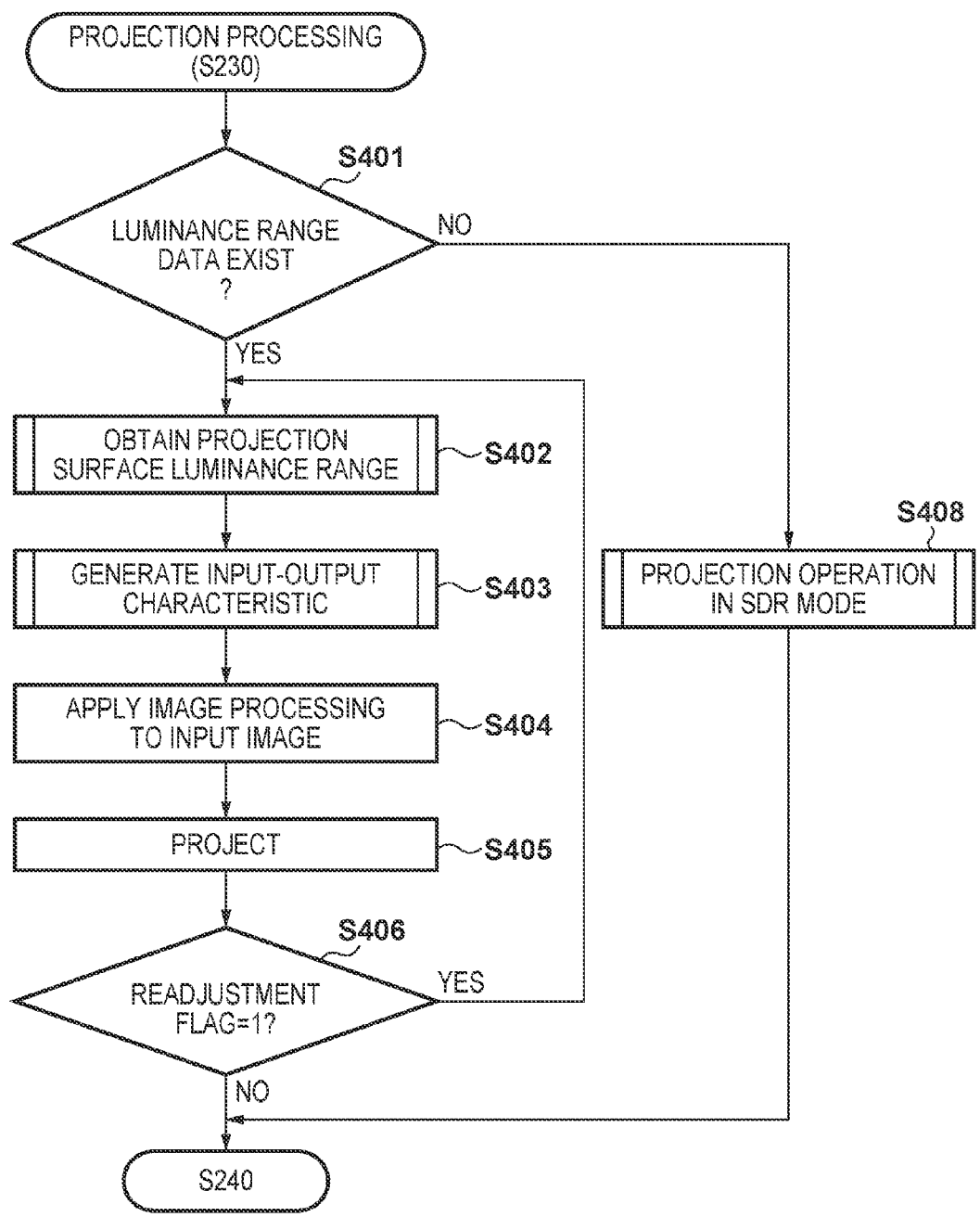
FIG. 4 is a flowchart related to a projecting operation according to a first embodiment.

Next, a description will be given, using FIGS. 3 and 4, of an operation of displaying (projecting) an HDR image in the LCD projector 100 according to this embodiment. FIG. 3 shows constituent elements related to the projecting operation among the constituent elements shown in FIG. 1, and the same reference numerals are assigned to the same constituent elements as those in FIG. 1. Note that, for convenience, processing executed in the HDR image projecting operation by the image processing unit 140 (application means) is shown as functional blocks. FIG. 4 is a flowchart showing the details of the projection processing (S230 in FIG. 1) for an HDR image. Note that whether image data or a video signal that is to be projected relates to an HDR image can be determined based on information indicating the type of transfer function used in the standard. For example, a video stream conforming to the HEVC standard can be discriminated based on the value of transfer characteristics in VUI (Video Usability Information), and a multiplexed stream conforming to MPEG-2 TS can be discerned based on the value of transfer_characteristics, which is a video decode control descriptor.

Here, a description will be given of the case where the display mode of the LCD projector 100 is the input image display mode, and a video signal of an HDR image in which the dynamic range is expressed using a transfer function (EOTF) for indicating the absolute luminance, as in the ST.2084 standard, is input to the image input unit 130. However, the same display processing can also be performed in the case where similar HDR image data is read out from the recording medium 192 or received via the communication unit 193. In the case where the image input unit 130 has an interface for transmitting digital signals such as an interface conforming to HDMI, video signals are input in a digital format. For this reason, a video signal of an HDR image that is input to the image input unit 130 will be hereinafter called HDR image data, as in the case of image data that is read out from the recording medium 192.

The HDR image data that is input from the image input unit 130 is first converted by a linear conversion unit 141 in the image processing unit 140 so as to obtain a liner input-output characteristic. For example, if the maximum tone value of the image is 1023 (10-bit image) and is associated with an absolute luminance of 2000 nit, the linear conversion unit 141 converts the tone value to obtain a linear relationship in which the absolute luminance is 1000 nit when the tone value is 512, and the absolute luminance is 0 nit when the tone value is 0. In the case where the tone value and the luminance value are thus in a linear relationship, it is called a linear luminance characteristic.

The HDR image data that has been converted by the linear conversion unit 141 to have a linear luminance characteristic is input to a range conversion unit 142. The range conversion unit 142 corrects the HDR image data using, for example, a one-dimensional look-up table (1D-LUT), and supplies the corrected HDR image data to a gamma conversion unit 143. The gamma conversion unit 143 corrects, in accordance with a gamma characteristic of the LCD device 151, the corrected HDR image data into gamma space data so as to be displayed with the linear luminance characteristic (gamma correction), and supplies the gamma-corrected HDR image data to the LCD control unit 150.

The details of the operation will be described with reference to FIG. 4.

In step S401, the luminance range obtaining unit 181 reads EXIF data or header information of the image data that has been input to the image input unit 130, determines whether absolute luminance range data regarding the input image exists, and notifies the CPU 110 of the determination result. This determination also serves as a determination as to whether the input image is an HDR image, and may be a determination as to whether the designated transfer function type indicates a transfer function using the absolute luminance range. The CPU 110 advances the processing to step S402 if the luminance range obtaining unit 181 determines that the absolute luminance range data regarding the input image exists, or advances the processing to step S408 if not.

In step S408, the CPU 110, the image processing unit 140, the LCD control unit 150, and the light source control unit 160 execute an operation for projecting the image data (SDR image data) that has a normal dynamic range, such as sRGB. In this case, the same processing as that in steps S220 to S250 in FIG. 2 need only be executed, and accordingly, the description of subsequent processing will be omitted. A series of projecting operations for SDR image data will be called an SDR mode operation.

Figure 5A:
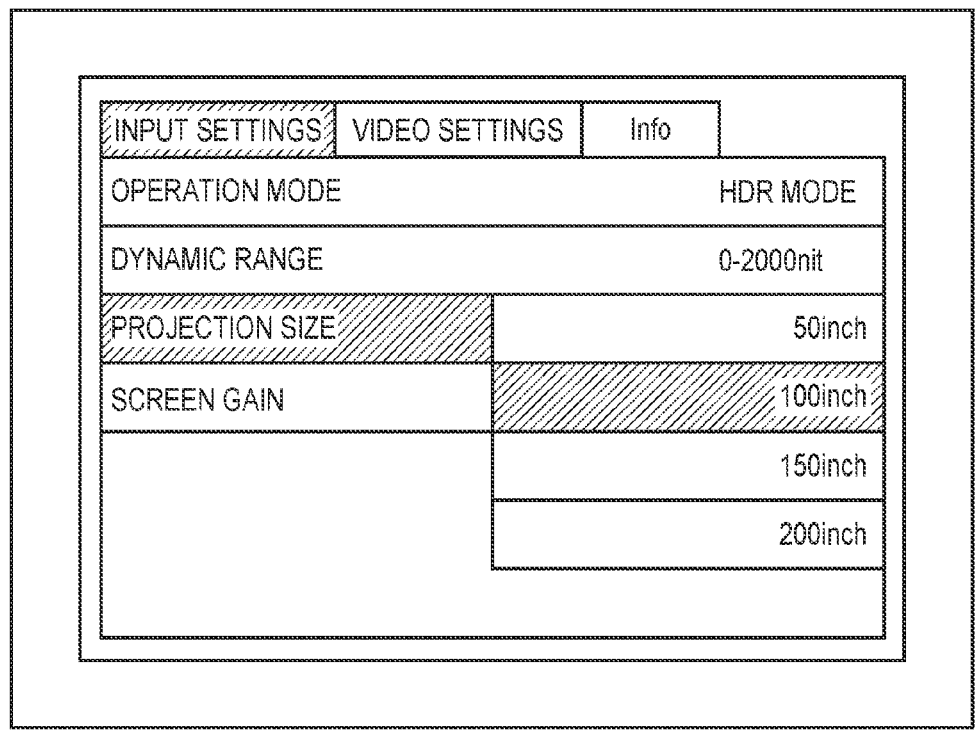
FIGS. 5A and 5B are diagrams showing exemplary setting screens of the LCD projector according to the embodiments.
Figure 5B:
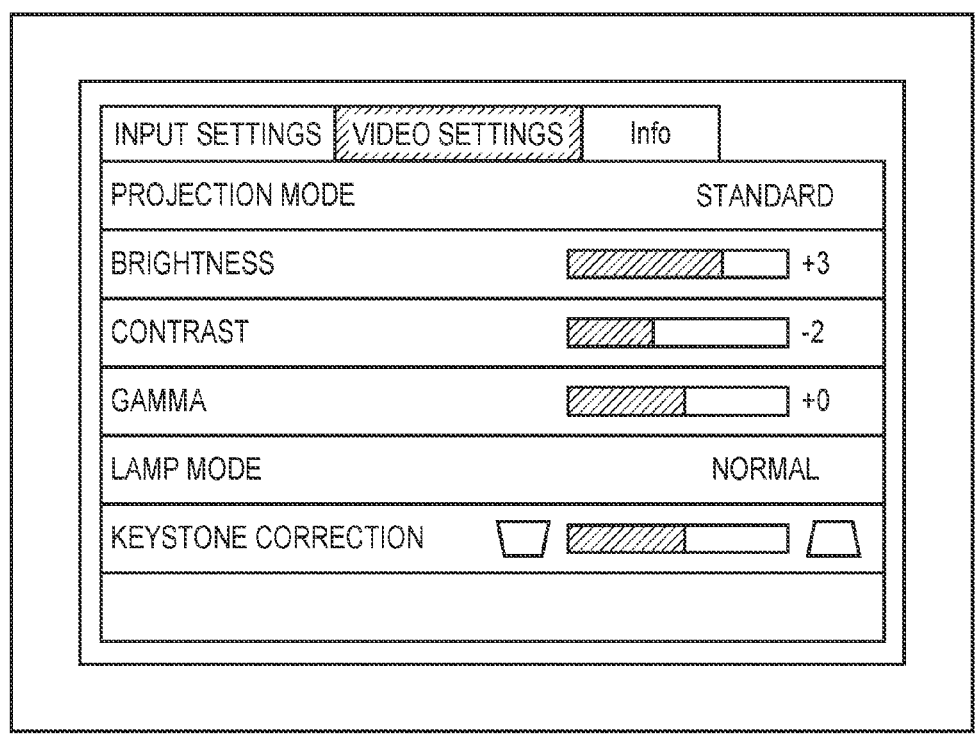

Note that if it is determined in step S401 by the luminance range obtaining unit 181 that EXIF data or header information itself does not exist, the CPU 110 may cause an input setting screen such as one shown in FIG. 5A to be displayed as an OSD to have the user designate characteristics of an input image, for example. Note that the OSD shown in FIGS. 5A and 5B can also be displayed in the case where a menu display instruction is input from the operation unit 113 or an external device.

On the input setting screen shown in FIG. 5A, an operation mode for HDR images (HDR mode) or an operation mode for SDR images (SDR mode) can be selected in an "operation mode" section. If the HDR mode is selected in the "operation mode" section, the luminance range of an input image can be set in a "dynamic range" section. In addition, the size of an image to be projected by the LCD projector 100 (at a predetermined distance) can be designated in a "projection size" section, and the screen gain (reflectance) can be designated in a "screen gain" section. Each item can be set by selecting prepared options that are displayed in accordance with an operation of selecting the corresponding item name. For example, FIG. 5A shows a state where the item "projection size" is selected, and 100 inches is selected from among four settable options. Upon a decision instruction being input in this state, the CPU 110 ends display of the options, and performs display at the set projection size of 100 inches. If an instruction to end the display of the OSD is given, the CPU 110 causes an end check screen to be displayed and has the user select whether to save the set content or end without saving the set content. If the HDR mode is set via the input setting screen, the CPU 110 advances the processing to step S402 rather than to step S408. Note that the input setting screen can be switched to a video setting screen (FIG. 5B) or an information display screen by selecting a tab.

In step S402, the CPU 110 transmits the set projection size and screen gain to the projection surface luminance obtaining unit 182. The projection surface luminance obtaining unit 182 calculates the projection surface luminance range using the received projection size and screen gain, and transmits the calculated projection surface luminance range to the CPU 110. The details thereof will be described later using a flowchart in FIG. 6A.

In step S403, the CPU 110 generates an input-output characteristic (tone-conversion characteristic) of the tone value to be applied by the range conversion unit 142, based on the input luminance range obtained from the luminance range obtaining unit 181 (or the input setting screen) and the projection surface luminance range obtained from the projection surface luminance obtaining unit 182. The CPU 110 then sets the generated input-output characteristic to a 1D-LUT that the range conversion unit 142 has. The details thereof will be described later using a flowchart in FIG. 6B.

In step S404, image processing performed by the linear conversion unit 141, the range conversion unit 142, and the gamma conversion unit 143 is applied to the input image data, and this image data is output to the LCD control unit 150.

In step S405, the LCD control unit 150 controls the transmission factors of the LCD devices 151R, 151G, and 151B in accordance with the image data that is input from the image processing unit 140 (gamma conversion unit 143).

In step S406, the CPU 110 checks the value of a readjustment flag, and returns the processing to step S402 if the value is 1 (i.e. the flag is ON), or ends the processing (i.e. advances the processing to step S240) if the value is 0 (i.e. if the flag is OFF). In this embodiment, the readjustment flag is set to 1 if the projection size or the screen gain has been changed on the input setting screen in FIG. 5A, or if a setting on the video setting screen in FIG. 5B has been changed, or if the in-focus position or the zoom magnification ratio in the projection optical system 171 has been changed.

Thus, projection processing for one frame is performed. Note that the processing in steps S402 and S403 may not be executed in every projection process for one frame.

Figure 6A:
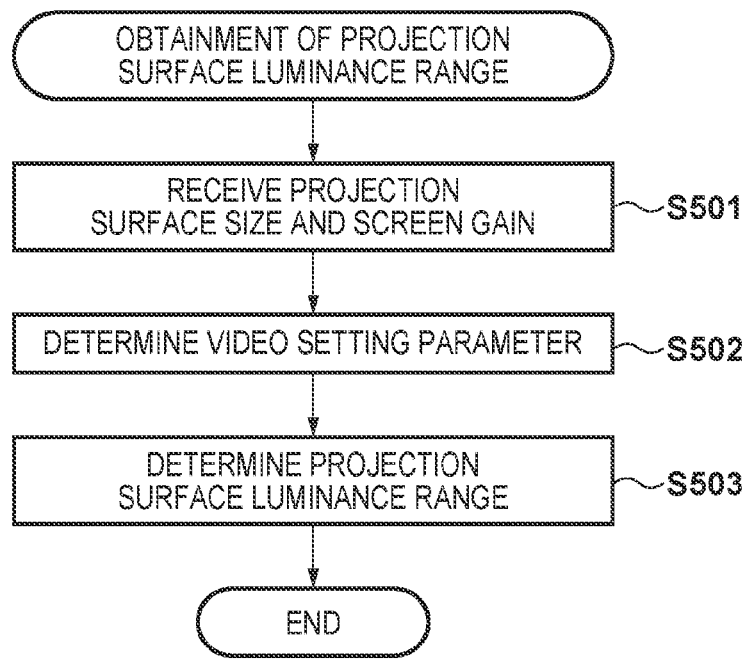
FIGS. 6A and 6B are flowcharts related to a projection surface luminance range obtaining operation and an input-output characteristic generating operation according to the first embodiment.

Next, the operation of obtaining the projection surface luminance range executed in step S402 will be described using the flowchart shown in FIG. 6A.

In step S501, the projection surface luminance obtaining unit 182 receives the set projection size and screen gain from the CPU 110.

In step S502, the projection surface luminance obtaining unit 182 determines the value of a video setting parameter. In the case where the light amount does not vary due to the settings, step S502 does not need to be executed. The video setting parameter is a coefficient for the light amount, and has a value other than 1 when the projector light amount varies due to the settings. In the LCD projector 100 according to this embodiment, set values for "projection mode", "brightness", "contrast", "gamma", and "lamp mode" among settable items on the video setting screen shown in FIG. 5B affect the amount of emitted light. For this reason, the projection surface luminance obtaining unit 182 determines the value of the video setting parameter corresponding to the current set values for these items. The projector light amount and the relationship between the set values and the value coefficient of the video setting parameter can be stored in a nonvolatile storage device that can be accessed by the projection surface luminance obtaining unit 182, e.g. in the ROM 111 or within the projection surface luminance obtaining unit 182.

Note that, for example, either a "presentation mode" or a "standard mode" can be set as the "projection mode". Here, it is assumed that the "presentation mode" corresponds to a video setting parameter of 1, and the "standard mode" corresponds to a video setting parameter of a value smaller than in the "presentation mode" (e.g. 0.9). Either "normal" or "energy-saving" can be set as the "lamp mode", and it is assumed that "normal" and "energy-saving" correspond respectively to a video setting parameter of 1 and a video setting parameter of a value smaller than in the case of "normal" (e.g. 0.9). For the other items as well, the relationship between settable values and a corresponding video setting parameter is determined in advance. Accordingly, the projection surface luminance obtaining unit 182 can determine the ultimate value of a video setting parameter by multiplying the set value of each item by the corresponding value of the video setting parameter. Note that the types of set items that affect the light amount and the relationship between the set values and the video setting parameter described above merely are examples, and are not limited thereto. The ultimate value of a video setting parameter may alternatively be obtained using other methods, e.g. by referencing correspondence between combinations of the set values and the value of the video setting parameter that is stored in advance.

In step S503, the projection surface luminance obtaining unit 182 calculates the projection surface luminance according to Equation 1 below, for example, based on the predetermined projector light amount, the projection size and the screen gain received in step S501, and the video setting parameter determined in step S502. Note that, if the projection size is in units of inches, the projection surface luminance obtaining unit 182 converts the projection size into square meters and applies the converted projection size to Equation 1.

$$\text{Projection surface luminance} = (\text{projector light amount [lm]} \times \text{video setting parameter} \times \text{screen gain}) / (\text{projection size [m}^2\text{]} \times Pi) \quad \text{(Equation 1)}$$

Here, the projector light amount may be a specification value (e.g. a measured value under JIS X 6911:2015). In the case where the light amount varies due to the settings, a predetermined reference light amount is applied. The maximum luminance on the projection surface that is achieved with the current settings is obtained based on Equation 1.

In this embodiment, the projection surface luminance at the time of an all-white screen (when all pixels project an image having the maximum tone value) (maximum luminance) is calculated using Equation 1, and the projection surface luminance at the time of an all-black screen (when all pixels project an image of a tone value of 0) is 0 [nit]. The projection surface luminance range is determined by the projection surface luminance at the time of an all-white screen (maximum luminance) and the projection surface luminance at the time of an all-black screen (minimum luminance). The projection surface luminance obtaining unit 182 notifies the CPU 110 of the projection surface luminance range. Note that if the minimum luminance that defines the projection surface luminance range is always 0 [nit], the projection surface luminance obtaining unit 182 may notify the CPU 110 of only the maximum luminance.

Figure 6B:
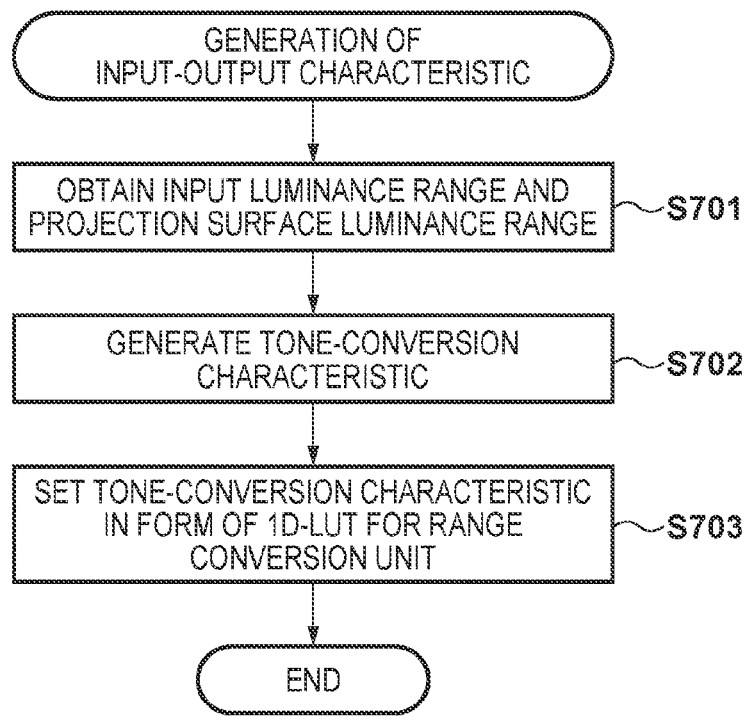

Next, the details of the operation to generate the input-output characteristic in step S403 will be described using the flowchart in FIG. 6B.

In step S701, the CPU 110 obtains the input luminance range and the projection surface luminance range from the luminance range obtaining unit 181 (or the input setting screen) and the projection surface luminance obtaining unit 182, respectively.

In step S702, the CPU 110 generates the input-output characteristic of the tone value that is to be set in the 1D-LUT in the range conversion unit 142, based on the input luminance range and the projection surface luminance range obtained in step S701.

Figure 7A:
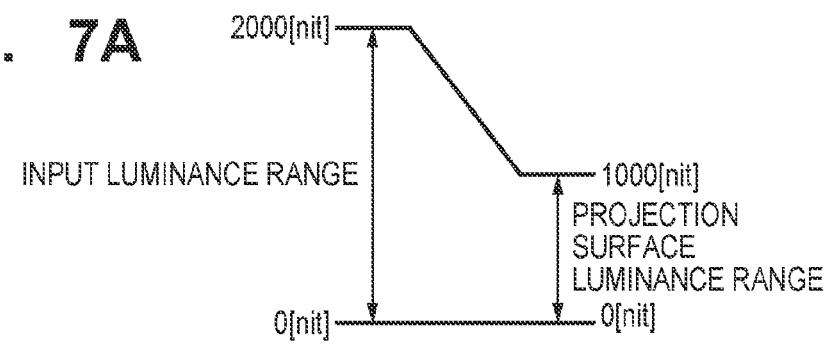
FIGS. 7A to 7D are diagrams showing exemplary relationships between an input luminance range and the projection surface luminance range.

For example, it is assumed that the input luminance range is from 0 [nit] to 2000 [nit], and the projection surface luminance range is from 0 [nit] to 1000 [nit], as shown in FIG. 7A.

A relationship between the tone value and the absolute luminance is defined for the HDR image data that is addressed in this embodiment, and it is assumed that an absolute luminance of 2000 [nit] is defined for a maximum tone value of 1023 (10-bit image data; the tone value will be hereinafter denoted by assuming 10-bit image data). Thus, the CPU 110 generates an input-output characteristic for converting the tone value so as to satisfy the defined relationship between the tone value and the absolute luminance in at least part of the tone value range in which display can be performed as defined in the projection surface luminance range. Accordingly, even if the input luminance range and the projection surface luminance range are different, display (projection) with the defined absolute luminance can be achieved in part of the tone value range.

Figure 8A:
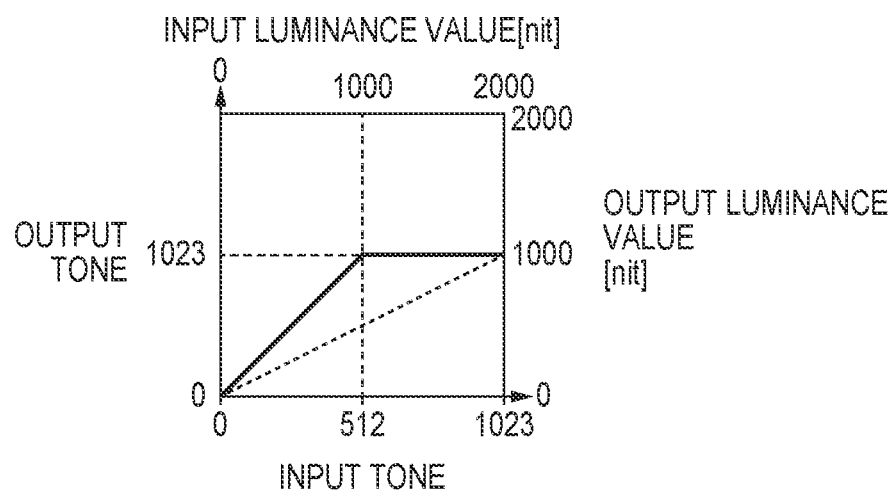
FIGS. 8A to 8E are diagrams showing examples of the input-output characteristic generated in the first embodiment.
Figure 8B:
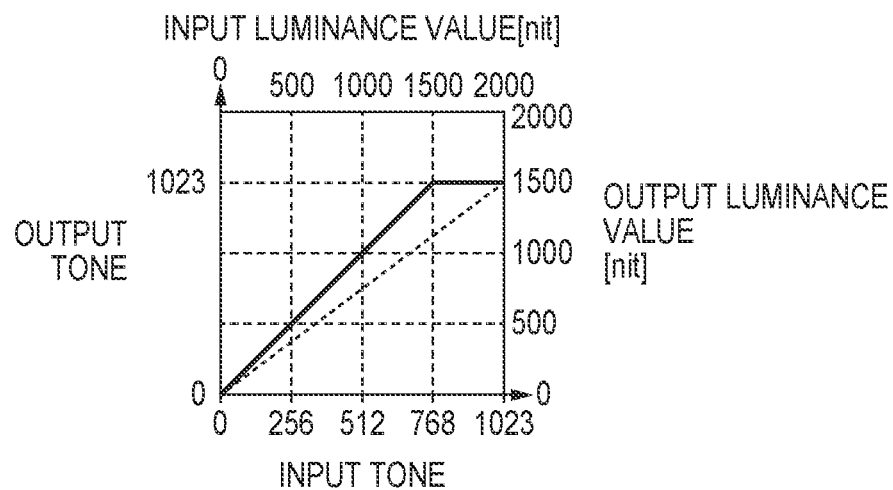

Since the input image has been converted by the linear conversion unit 141 so as to have a linear relationship between the tone value and the luminance value, the absolute luminance value is 1000 [nit] when the tone value of the input image is 512. When the output tone value is 1023, which is the maximum tone value, the output luminance value is 1000 [nit], which is the maximum luminance in the projection surface luminance range. Accordingly, the CPU 110 generates the input-output characteristic so as to satisfy the relationship between the tone value and the absolute luminance value defined for the input image in a range equal to or smaller than the tone value (512 or smaller) at which the input luminance value is 1000 [nit] and less, and such that the output luminance value is saturated at 1000 [nit] when the tone value is greater than 512. This input-output characteristic is indicated by a thick line in FIG. 8A. Note that a thin line in FIG. 8A indicates a conventional input-output characteristic obtained by compressing the entire input luminance range to adjust the input luminance range to the projection surface luminance range. With such a conventional input-output characteristic, an image for which the relationship between the tone value and the absolute luminance value is defined cannot be displayed with the correct luminance for all tone values.

Figure 7B:
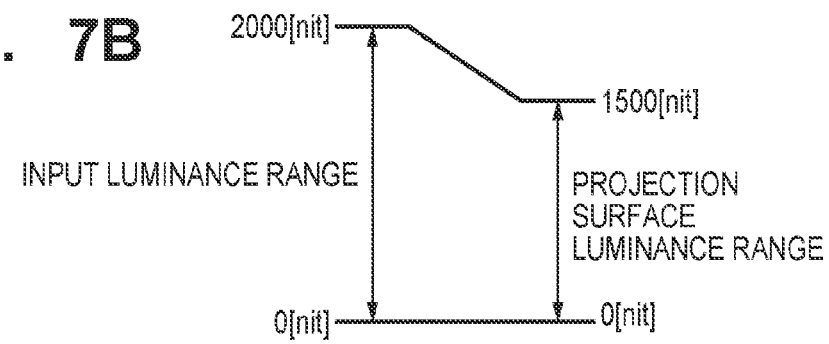
Figure 9A:
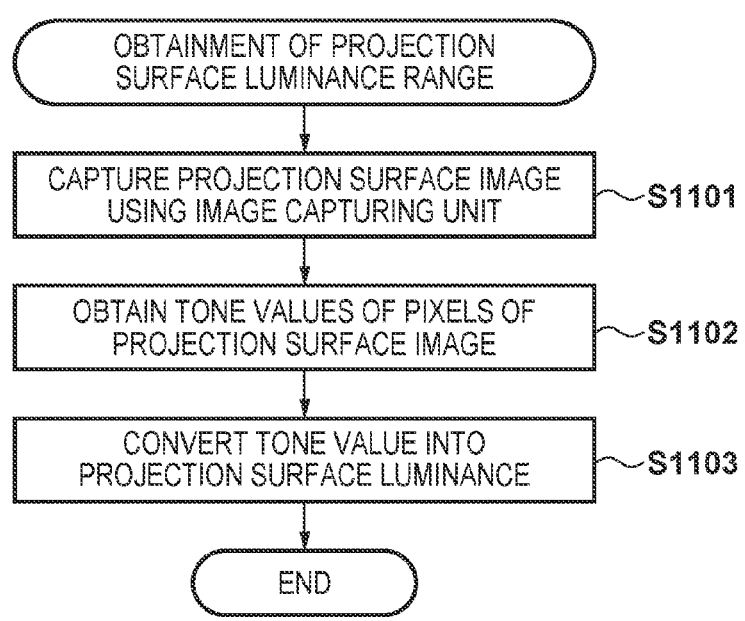
FIGS. 9A and 9B are flowcharts related to a projection surface luminance range obtaining operation according to the second and third embodiments.
Figure 9B:
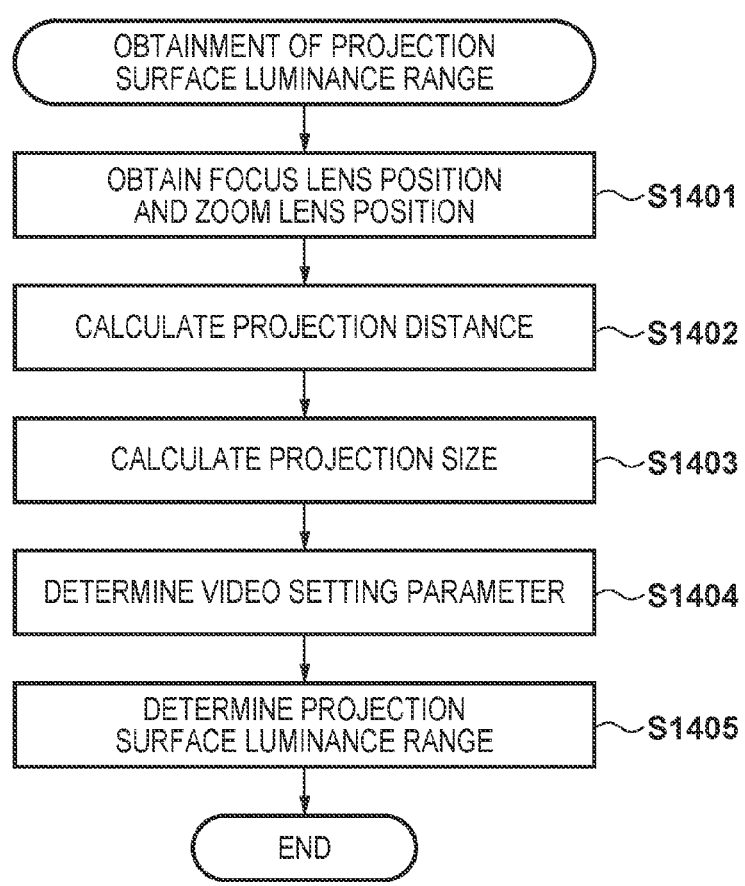

As mentioned above, the projection surface luminance range, particularly the maximum luminance value in the projection surface luminance range varies depending on the settings, the projection distance, or the like. For example, if the maximum luminance value in the projection surface luminance range increases up to 1500 [nit] as shown in FIG. 7B, the CPU 110 generates an input-output characteristic (FIG. 9B) for correctly displaying the input tone value that is associated with an absolute luminance value of 0 to 1500 [nit] in the input image. That is to say, in an input image whose output luminance value is 1500 [nit] when the output tone value is 1023 and that has been converted by the linear conversion unit 141, a tone value of 768 is associated with an absolute luminance value of 1500 [nit]. Accordingly, the CPU 110 generates an input-output characteristic in which the absolute luminance value linearly increases from 0 to 1500 [nit] in the range of the input tone value from 0 to 768, and the output tone value is saturated at 1023 in the range of the input tone value from 768 to 1023. Thus, the input image is displayed (projected) with the correct luminance in the range of the input tone value from 0 to 768.

Figure 7C:
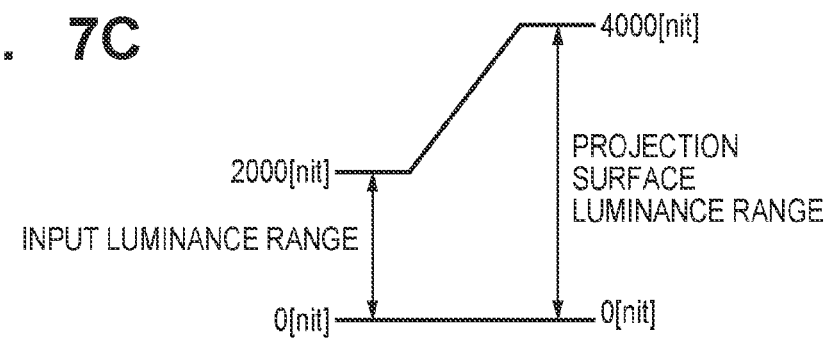
Figure 7D:
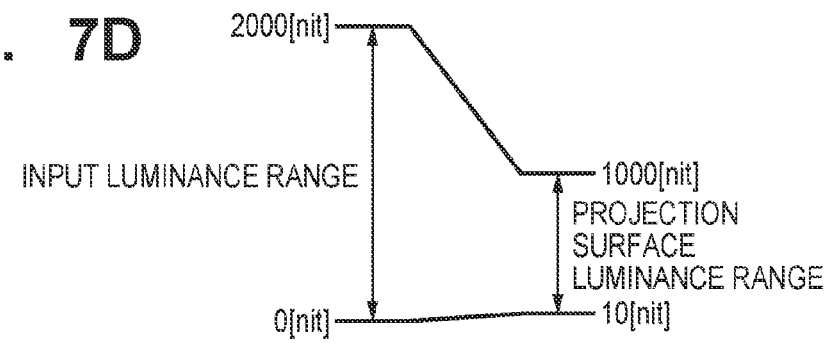
Figure 8C:
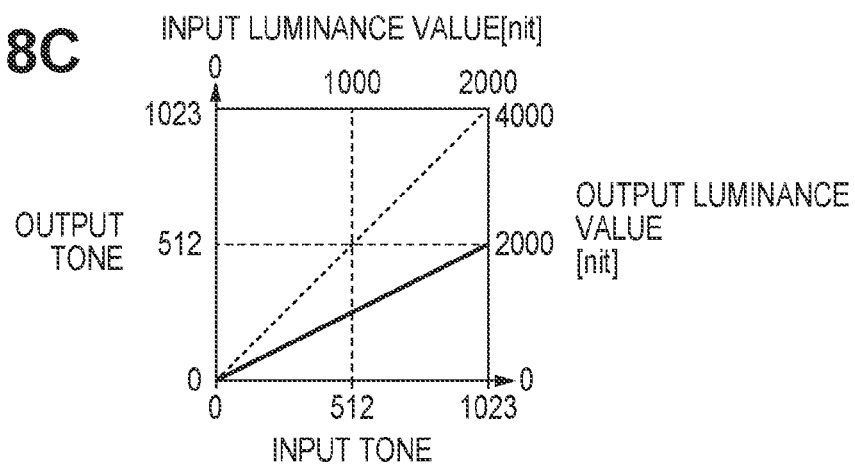

There are also cases where the projection surface luminance range is larger than the input luminance range. FIG. 7C shows the case where the input luminance range is 0 to 2000 [nit], while the projection surface luminance range is 0 to 4000 [nit]. In this case, the CPU 110 generates an input-output characteristic in which only the output luminance in the range from 0 to 2000 [nit] is used, as shown in FIG. 8C. That is to say, the CPU 110 generates a linear input-output characteristic in which the output luminance value is 2000 [nit] when the output tone value is 1023, and the output luminance value is 0 [nit] when the output tone value is 0. In this case, display (projection) can be correctly performed with the defined absolute luminance for all tone values of the input image. The thin line in FIG. 8C indicates a conventional input-output characteristic in which the entire input luminance range is expanded in accordance with the projection surface luminance range. With such a conventional input-output characteristic, an image for which the relationship between the tone value and the absolute luminance value is defined cannot be displayed with the correct luminance for all tone values.

Figure 8D:
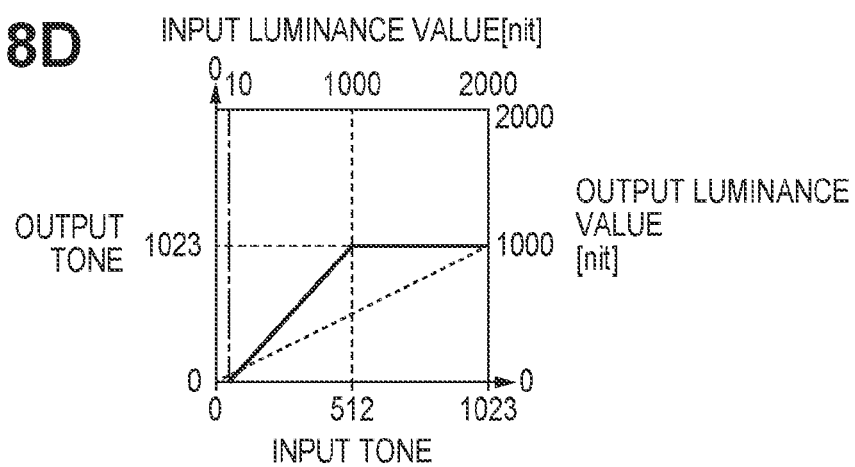

Note that the projection surface luminance of the LCD projector 100 is not 0 [nit] at the time of an all-black projection in some cases. In such cases, the minimum luminance in the projection surface luminance is greater than 0 [nit]. For example, FIG. 8D shows an example in which the input luminance range is 0 to 2000 [nit], and the projection surface luminance range is 10 to 1000 [nit]. In this case, the LCD projector 100 cannot perform display with a luminance smaller than 10 [nit]. Accordingly, the CPU 110 generates an input-output characteristic (FIG. 8D) with which display is correctly performed for the input tone values that correspond to absolute luminances of 10 to 1000 [nit]. This input-output characteristic is equivalent to the characteristic in FIG. 8A that has been changed such that the output luminance value is 10 [nit] in the range of the input luminance value smaller than 10 [nit].

Figure 8E:
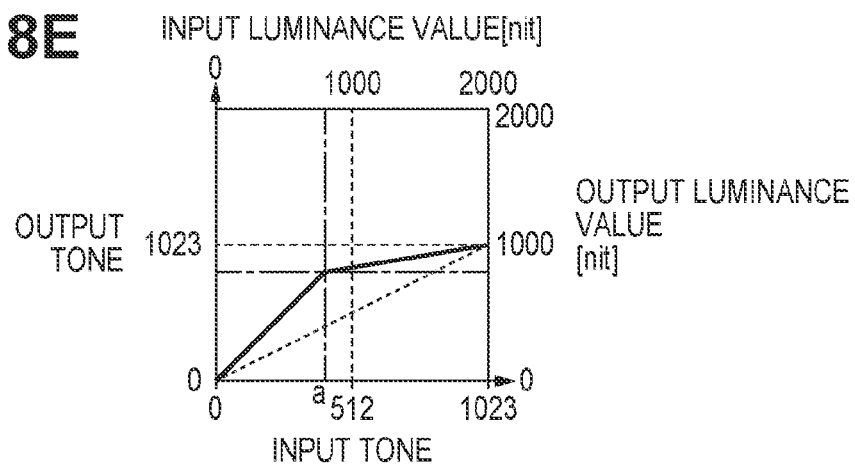

In this embodiment, when HDR image data is displayed, an input-output characteristic is generated in which the tone characteristic is not compressed or expanded in the range where the tone characteristic can be correctly reproduced. However, depending on the use, e.g. in the case where the presence of a saturated area is not favorable, an input-output characteristic may be generated in which the input luminance value does not coincide with the output luminance value in part of the input tone range where the tone characteristic can be correctly reproduced, in order to suppress saturation. In the example in FIG. 8E, an input-output characteristic is generated in which the input luminance value does not coincide with the output luminance value in part (here, a to 512) of the input tone range (here, 0 to 512) where the tone characteristic can be correctly reproduced. Thus, the input tone range in which the tone characteristic can be correctly reproduced is small, but the tones corresponding to input tones of 512 to 1023 can be expressed.

In step S703, the CPU 110 sets the input-output characteristic generated in step S702 in the form of a 1D-LUT in the range conversion unit 142, and ends the input-output characteristic generation processing. The range conversion unit 142 converts the tone values of the input image using the 1D-LUT. Note that the input-output characteristic generation and range (tone) conversion are executed for each color component of the pixels.

Note that, although a configuration has been described here in which the processing for linearly converting the relationship between the tone of the input image and the luminance and the processing for converting the input tone into the output tone are separately performed in the image processing unit 140, a configuration in which an input-output characteristic obtained by combining these two conversions is set in a 1D-LUT may also be employed. In this case, the linear conversion unit 141 is not required.

According to this embodiment, when an HDR image for which the display luminance relative to the tone values is defined as the absolute luminance values is displayed (projected), the tone-conversion characteristic is determined so as to include a range in which display can be performed with the correct tone, based on the relationship between the input luminance range and the projection surface luminance range. As a result, it is possible to solve the inability to correctly display all tones in the case of using a tone-conversion characteristic in which the entire input luminance range is compressed or expanded in accordance with the projection surface luminance range.

Second Embodiment

Next, the second embodiment of the present invention will be described. This embodiment may be the same as the first embodiment except for the processing to obtain the projection surface luminance range executed in step S402 in FIG. 4, and accordingly, the processing to obtain the projection surface luminance range according to this embodiment will be described below using a flowchart shown in FIG. 9A.

In this embodiment, the projection surface luminance range is obtained using the image capturing unit 194, which is arranged so as to be able to capture an image in the optical axis direction (projection direction) of the projection optical system 171.

Figure 10A:
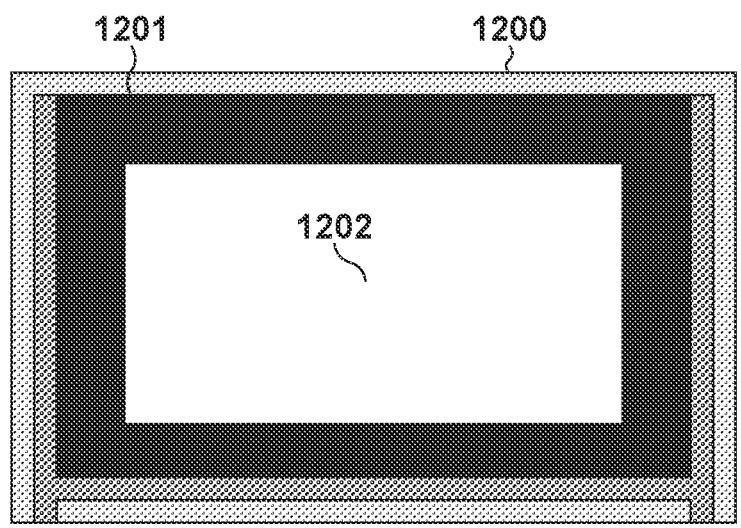
FIGS. 10A and 10B are diagrams related to the projection surface luminance range obtaining operation according to a second embodiment.

In step S1101, the CPU 110 controls each unit to project a specific image (here, a white image for which the maximum tone value is set for all pixels in order to obtain the maximum value of the projection surface luminance), and thereafter instructs the image capturing unit 194 to capture an image. The image capturing unit 194 captures an image in response to the instruction. FIG. 10A schematically shows an image 1200 obtained by the image capturing unit 194. In the image 1200, 1201 denotes a screen, and 1202 denotes a projected white image. In the case of also obtaining the minimum value of the projection surface luminance, an image in a state where a black image with the tone value of all pixels being 0 is projected is also captured by the image capturing unit 194. The image capturing unit 194 writes the data of the captured image in the RAM 112, for example.

In step S1102, the CPU 110 instructs the projection surface luminance obtaining unit 182 to obtain the projection surface luminance. In response to the instruction, the projection surface luminance obtaining unit 182 obtains or calculates pixel values (tone values) in the area of the projected image 1202 in the image 1200 stored in the RAM 112. Here, it is assumed that the center position of the projected image 1202 in the image 1200 is known from the positional relationship between the optical axis of the image capturing unit 194 and the optical axis of the projection optical system 171. Accordingly, the projection surface luminance obtaining unit 182 calculates the tone value of the projected image 1202 based on the value of the pixel at the center position in the projected image or the values of the pixels included in a given area from the center in the image 1200. Alternatively, the projection surface luminance obtaining unit 182 may apply binarization or Hough transform to the image 1200 by using, for example, the image processing unit 140 to detect the area of the projected image 1202, and calculate the tone value based on all pixel values within the area. The projection surface luminance obtaining unit 182 can average pixel values to calculate the tone value, for example, but may perform the calculation using other methods.

Figure 10B:
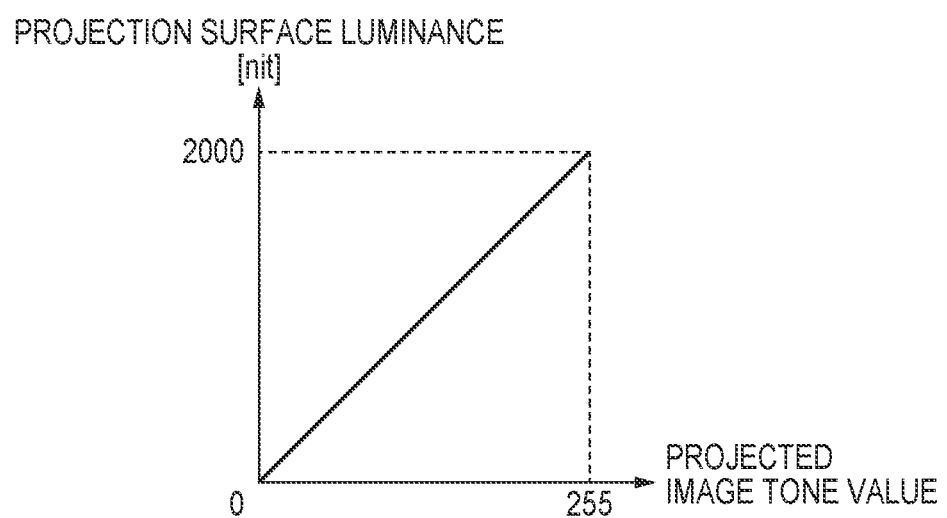

In step S1103, the projection surface luminance obtaining unit 182 converts the tone value calculated in step S1102 into the projection surface luminance. For example, a table or a transformation for indicating the relationship between the tone value and the projection surface luminance such as that shown in FIG. 10B can be saved in advance in the ROM 111. The projection surface luminance obtaining unit 182 can then convert the tone value into the projection surface luminance by referencing the table using the tone value or substituting the tone value in the transformation. The conversion table is created through actual measurement before the LCD projector 100 is shipped, and is saved in the ROM 111, for example. Although, in the example in FIG. 10B, a tone value of 255 is converted into a projection surface luminance of 2000 [nit], and the tone value and the projection surface luminance are in a linear relationship, the values of the projection surface luminance relative to the tone values and variation characteristics of the tone value and the projection surface luminance are not limited thereto.

In the case of also obtaining the minimum value of the projection surface luminance, the projection surface luminance obtaining unit 182 also obtains, in the same manner, the projection surface luminance of an image obtained by projecting a black image and capturing the projected black image.

The projection surface luminance obtaining unit 182 thus determines the projection surface luminance range, and notifies the CPU 110 of the determined projection surface luminance range.

This embodiment can also achieve the same effect as that of the first embodiment. In the case where, for example, a light source is provided for each area, the projection surface luminance range can be obtained for each of the areas corresponding to the respective light sources. For example, the projection surface luminance range may be obtained by dividing the projected image area into areas corresponding to the respective light sources, obtaining the tone values for the respective divided areas based on the pixels within those divided areas, and converting the thus-obtained tone values into the projection surface luminances.

Third Embodiment

Next, the third embodiment of the present invention will be described. This embodiment may be the same as the first embodiment except for the processing to obtain the projection surface luminance range executed in step S402 in FIG. 4, and accordingly, the processing to obtain the projection surface luminance range according to this embodiment will be described below using a flowchart shown in FIG. 9B.

In this embodiment, the projection surface luminance range is obtained using the in-focus distance in the projection optical system 171.

In step S1401, the projection surface luminance obtaining unit 182 obtains the focusing lens position and the zoom range position in the projection optical system 171 from the optical system control unit 170. The CPU 110 may obtain these lens positions from the optical system control unit 170 and notify the projection surface luminance obtaining unit 182 of the obtained lens positions.

Figure 11A:
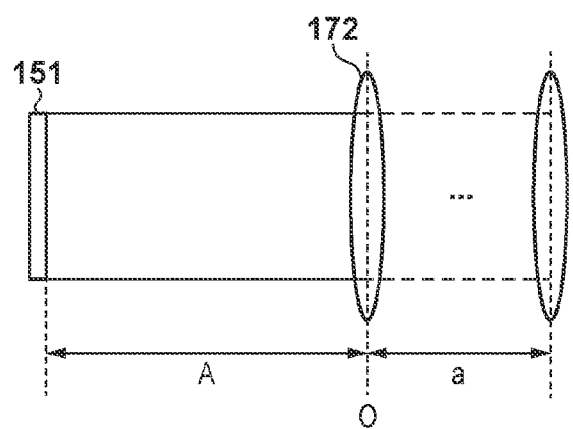
FIGS. 11A and 11B are diagrams related to a projection distance calculating operation according to the third embodiment.

In step S1402, the projection surface luminance obtaining unit 182 calculates the projection distance. For example, the projection surface luminance obtaining unit 182 reads out the focal distance of the focusing lens and the shortest distance between the LCD device 151 and the focusing lens that are stored in advance in the ROM 111. As shown in FIG. 11A, the shortest distance between the LCD device 151 and the focusing lens 172, which is included in the projection optical system and moves in the range a, is denoted as A. The focal distance of the focusing lens is denoted as F.

Figure 11B:
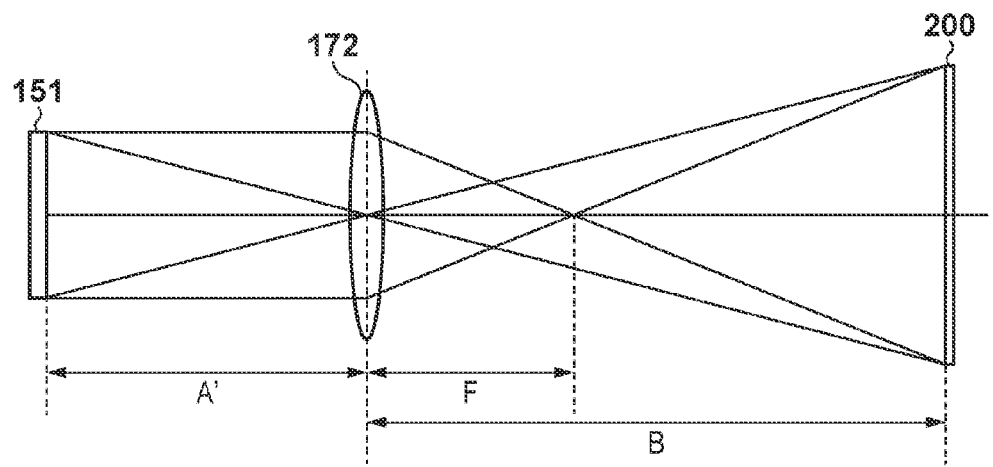

The focusing lens position obtained in step S1401 indicates the distance with the position shown in FIG. 11A being 0, and therefore, the current distance A' between the focusing lens and the LCD device 151 can be found based on the focusing lens position and the shortest distance A between the LCD device 151 and the focusing lens. FIG. 11B shows the positional relationship between the LCD device 151, the focusing lens 172 in the projection optical system 171, and a screen 200. The projection surface luminance obtaining unit 182 can calculate the distance from the focusing lens 172 to the screen 200, i.e. the projection distance B of the LCD projector 100, based on the formula of lens (Equation 2) using the distance A' and the focal distance F of the focusing lens 172.

$$1/A'+1/B=1/F \quad \text{(Equation 2)}$$

$$B=FA'/(A'-F)$$

In step S1403, the projection surface luminance obtaining unit 182 converts the current zoom lens position into the zoom magnification ratio based on the relationship between the zoom lens position and the zoom magnification ratio that is stored in advance in the ROM 111, for example. The projection surface luminance obtaining unit 182 can then calculate the projection size in accordance with Equation 3 below based on the projection distance B, the zoom magnification ratio, and the size of the LCD device 151. Note that the size of the LCD device 151 may be area [m²], or may be the lengths in the vertical and horizontal directions or the diagonal length, for example.

Projection size=$B/A'$×zoom magnification ratio×size of LCD device 151 (Equation 3)

Steps S1404 and S1405 will not be described since these steps are the same as steps S502 and S503 in the first embodiment.

This embodiment can also achieve the same effect as that of the first embodiment. In addition, the projection size is obtained based on the actual projection distance in this embodiment. Accordingly, when it is possible that the distance between the LCD projector 100 and the projection surface will change, a more accurate projection surface luminance range can be obtained than in the case of using the set projection size as in the first embodiment.

Note that, in this embodiment, the projection distance is calculated using the focusing lens position and the focal distance, but a configuration in which the LCD projector 100 directly measures the projection distance may be provided, or the projection distance may be obtained using any other method.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-066314, filed on Mar. 29, 2016, which is hereby incorporated by reference herein in its entirety.

What is claimed is:

1. A projector comprising:
    a first obtaining unit configured to obtain information that defines a relationship between a tone value and an absolute luminance value of image data to be projected;

a second obtaining unit configured to obtain a maximum luminance on a projection surface that is achieved by the projector;

a generation unit configured to generate a tone-conversion characteristic based on the information and the maximum luminance; and an application unit configured to apply the tone-conversion characteristic to the image data and supply the image data to projection unit, wherein the generation unit generates the tone-conversion characteristic such that a relationship between the tone value of the image data after the tone-conversion characteristic has been applied thereto and a luminance on the projection surface satisfies the relationship between the tone value and the absolute luminance value obtained by the first obtaining unit in at least part of a tone value range.

2. The projector according to claim 1, wherein the generation unit generates the tone-conversion characteristic such that the relationship is satisfied in a tone value range equal to or smaller than a tone value corresponding to the maximum luminance.

3. The projector according to claim 1, wherein, if a minimum luminance on the projection surface is greater than a minimum value of the absolute luminance value, the generation unit generates the tone-conversion characteristic such that the relationship is satisfied in a range from a tone value corresponding to the minimum luminance to a tone value corresponding to the maximum luminance.

4. The projector according to claim 1, wherein the second obtaining unit obtains the maximum luminance on the projection surface based on a predetermined reference light amount, a screen gain, and a projection size of the projector.

5. The projector according to claim 4, wherein the second obtaining unit obtains the maximum luminance on the projection surface by using a coefficient that is determined based on a set value for the projector.

6. The projector according to claim 4, wherein the second obtaining unit calculates the projection size based on a projection distance of the projection unit, and a zoom magnification ratio of a projection optical system provided in the projection unit.

7. The projector according to claim 6, wherein the second obtaining unit calculates the projection distance based on information regarding a position and a focal distance of a focusing lens included in the projection optical system provided in the projection unit.

8. The projector according to claim 1, wherein the image data is image data for which a display luminance is defined as an absolute luminance.

9. The projector according to claim 1, wherein the second obtaining unit obtains the maximum luminance on the projection surface based on an image obtained by capturing the projection surface.

10. The projector according to claim 9, further comprising:
image capturing unit configured to capturing the image of the projection surface.

11. A method for controlling a projector, the method comprising:
obtaining information that defines a relationship between a tone value and an absolute luminance value of image data to be projected;
obtaining a maximum luminance on a projection surface that is achieved by the projector;
generating a tone-conversion characteristic based on the information and the maximum luminance; and
applying the tone-conversion characteristic to the image data and supplying the image data to projection unit,
wherein, during the generating, the tone-conversion characteristic is generated such that a relationship between the tone value of the image data after the tone-conversion characteristic has been applied thereto and a luminance on the projection surface satisfies the relationship between the tone value and the absolute luminance value obtained during the obtaining in at least part of a tone value range.

12. A non-transitory computer-readable medium that stores a program for causing a computer provided in a projector to function as:
a first obtaining unit configured to obtain information that defines a relationship between a tone value and an absolute luminance value of image data to be projected;
a second obtaining unit configured to obtain a maximum luminance on a projection surface that is achieved by the projector;
a generation unit configured to generate a tone-conversion characteristic based on the information and the maximum luminance; and
a application unit configured to apply the tone-conversion characteristic to the image data and supply the image data to a projection unit,
wherein the generation unit generates the tone-conversion characteristic such that a relationship between the tone value of the image data after the tone-conversion characteristic has been applied thereto and a luminance on the projection surface satisfies the relationship between the tone value and the absolute luminance value obtained by the first obtaining unit in at least part of a tone value range.

* * * * *